(12) United States Patent
Pasternak

(10) Patent No.: US 7,761,107 B2
(45) Date of Patent: Jul. 20, 2010

(54) MULTI-CHANNEL COMMUNICATION DEVICE

(75) Inventor: Shawn Pasternak, Long Beach, CA (US)

(73) Assignee: Anchor Audio, Inc., Torrance, CA (US)

( * ) Notice: Subject to any disclaimer, the term of this patent is extended or adjusted under 35 U.S.C. 154(b) by 1438 days.

(21) Appl. No.: 11/066,798

(22) Filed: Feb. 25, 2005

(65) Prior Publication Data

US 2006/0194611 A1 Aug. 31, 2006

(51) Int. Cl.
*H04B 7/00* (2006.01)
(52) U.S. Cl. .................. 455/515; 455/88; 455/41.2
(58) Field of Classification Search .............. 455/78, 455/79, 88, 41.2, 507, 508, 515
See application file for complete search history.

(56) References Cited

U.S. PATENT DOCUMENTS 6,894,988 B1 * 5/2005 Zehavi ..................... 370/278
7,103,392 B2 * 9/2006 Fletcher et al. .......... 455/569.1

* cited by examiner

*Primary Examiner*—Edward Urban
*Assistant Examiner*—Christian A Hannon
(74) *Attorney, Agent, or Firm*—The Eclipse Group LLP

(57) ABSTRACT

A multi-channel communication device for transmitting on a first frequency band or a second frequency band is disclosed. The multi-channel communication device may include a first transceiver operating at the first frequency band, a second transceiver operating at the second frequency band, and a controller in signal communication with the first transceiver and the second transceiver, wherein the controller may be configured to determine whether the first transceiver and the second transceiver are in operation.

4 Claims, 6 Drawing Sheets

MULTI-CHANNEL COMMUNICATION DEVICE

BACKGROUND OF THE INVENTION

1. Field of Invention

The invention relates to communication systems, and in particular, to two-way communication systems utilizing multiple transceivers.

2. Related Art

Simple two-way communication systems such as internal communication systems (i.e., "intercom systems") are well known in the art for allowing multiple users to communicate with each other via a simple communication network. Intercom systems are usually designed for station to station dialing within a specific location such as a building. Generally, the intercom system includes a plurality of communication devices (also known as "stations") where each communication device is assigned an identification key that allows each communication device in the intercom system to communicate with the other individual communication devices by utilizing the identification key (also known as station-to-station dialing). Unlike most telecommunication systems, such as telephone networks or wireless communication networks, typical intercom systems allow users located within a location (such as a building) to call other users located within the same location without using an outside communication network such as a telephone (i.e., an outside line).

FIG. 1 shows a typical known intercom system 100. The intercom system 100 may include multiple communication devices that are in signal communication with each other and are capable of communicating individually between communication devices or communicating in a broadcast mode from an individual communication device to all other devices in the intercom system 100. As an example, the intercom system 100 may include three communication devices, such as first communication device 102, second communication device 104, and third communication device 106. While three communication devices are shown in FIG. 1, it is appreciated by those skilled in the art that the intercom system 100 may include optionally any number of communication devices, from two communication devices to as many as desired. An as an example, the first communication device 102, second communication device 104, and third communication device 106 may be implemented with wired or wireless intercom modules that are in signal communication with each other.

The communication devices may operate in either specific device-to-device communications mode (i.e., station-to-station dialing) or in a broadcast mode. As an example of a specific device-to-device communications mode, the first communication device 102 and second communication device 104 may communicate to each other via signal path 108. Similarly, the first communication device 102 and third communication device 106 may communicate to each other via signal path 110. Moreover, the second communication device 104 and third communication device 106 may communicate to each other via signal path 112.

As an example of a broadcast mode, the first communication device 102 may communicate to both the second communication device 104 and the third communication device 106 simultaneously via signal path 114. Similarly, the second communication device 104 may communicate to both the first communication device 102 and the third communication device 106 simultaneously via signal path 116. Additionally, the third communication device 106 may communicate to both the first communication device 102 and the second communication device 104 simultaneously via signal path 118. The signal paths 108, 110, 112, 114, 116, and 118 may be either wired and/or wireless communication paths.

In an example of operation, the communication devices in the intercom system 100 may include selection switches (not shown) that allow individual communication devices to either communicate in a broadcast mode to all the other communication devices simultaneously or to specific other communication devices in the specific device-to-device mode. Unfortunately, the intercom system 100 does not allow two or more users, located at two or more communication devices, to communicate back and forth simultaneously because typically the intercom system 100 is only a half-duplex type of communication system that allows transmitting in both directions only one direction at a time. Therefore, a user located at the second communication device 104 is not able to simultaneous communicate with the first communication device 102 when the first communication device 102 or the third communication device 106 is transmitting because the second communication device 104 is receiving the transmissions from either first communication device 102 or the third communication device 106.

Attempts to correct this problem may include adding additional electronic circuitry to the communication devices in the intercom system to allow the communication devices to operate in a full duplex mode of operation that would allow simultaneous transmissions in both directions. For example, frequency division multiple access ("FDMA"), time division multiple access ("TDMA"), and code division multiple access ("CDMA") transceivers may be utilized.

However, these approaches are technically complex, expensive, and typically require a high level of technical expertise to implement and maintain. As a result, these types of solutions do not lend themselves to intercom systems that may be easily acquired and installed (i.e., "do-it-yourself systems") by typical consumers. Therefore, there is a need for a simple communication system of low complexity that is inexpensive, easy to maintain, and may be utilized as an intercom system.

SUMMARY OF THE INVENTION

A multi-channel communication device for transmitting on a first frequency band or a second frequency band is disclosed. The multi-channel communication device may include a first transceiver operating at the first frequency band, a second transceiver operating at the second frequency band, and a controller in signal communication with the first transceiver and the second transceiver. The first transceiver may include a first receiver configured to receive a first frequency band input communication signal and in response produce a first received input signal, and a first transmitter configured to receive an audio input signal and in response produce a first transmitted output signal from the audio input signal. The second transceiver may include a second receiver configured to receive a second frequency band input communication signal and in response produce a second received input signal, and a second transmitter configured to receive the audio input signal and in response produce a second transmitted output signal from the audio input signal. The controller may be configured to determine whether the first transceiver and the second transceiver are in operation.

In an example method of operation, the controller in the multi-channel communication device may determine whether the first transceiver and the second transceiver are in operation, and command the first transceiver to transmit the first transmitted output signal in response to the controller determining that the first transceiver is not in operation. Additionally, the controller may command the second transceiver to transmit a second transmitted output signal in response to determining that the first transceiver is in operation and that the second transceiver is not in operation. Similarly, the controller may command both the first transceiver not to transmit the first transmitted output signal and the second transceiver not to transmit the second transmitted output signal in response to determining that the first transceiver and the second transceiver are both in operation.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

DETAILED DESCRIPTION

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

Figure 1:
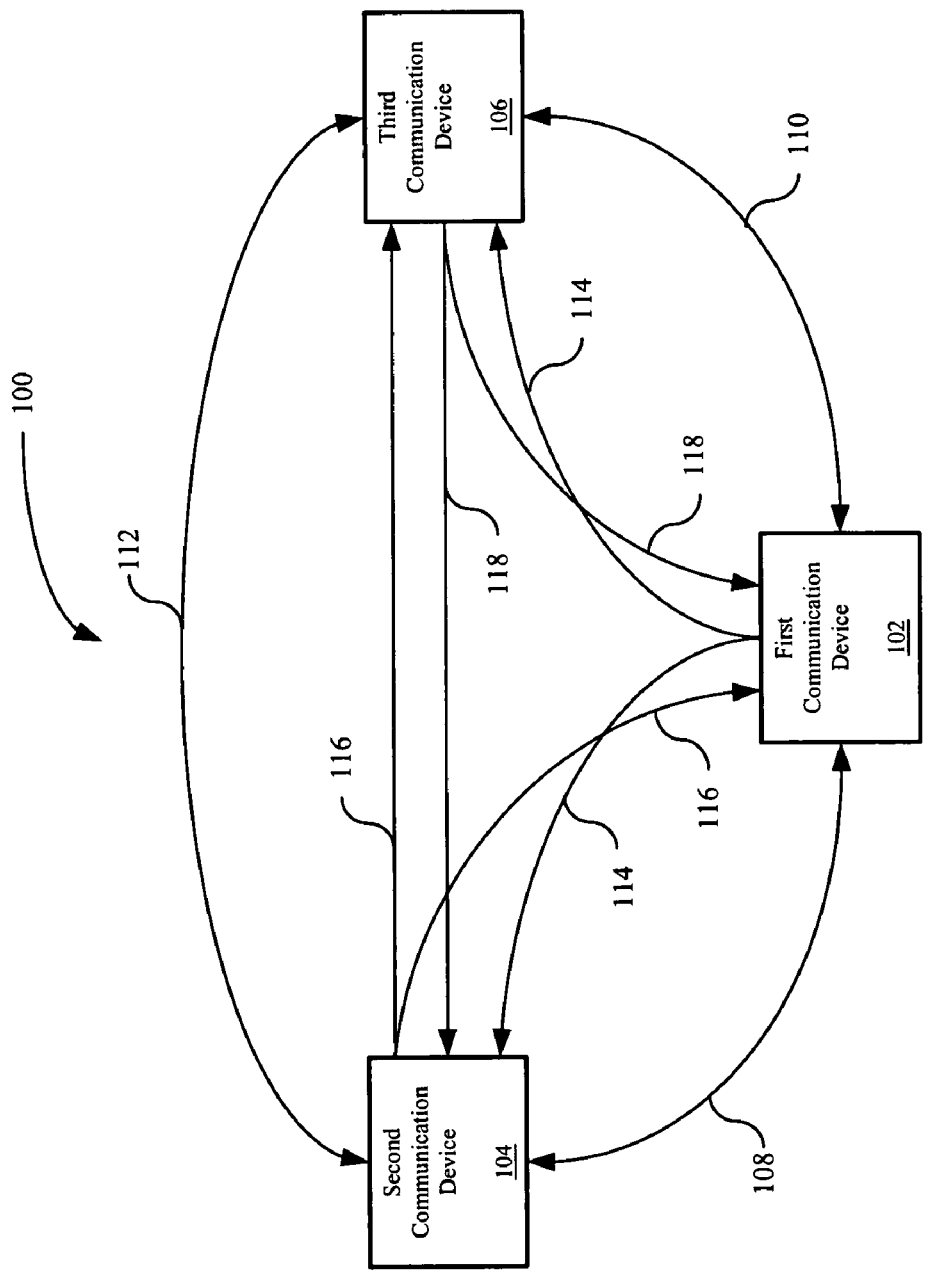
FIG. 1 is a block diagram of an example of an implementation of a known internal communication system ("intercom system").
Figure 2:
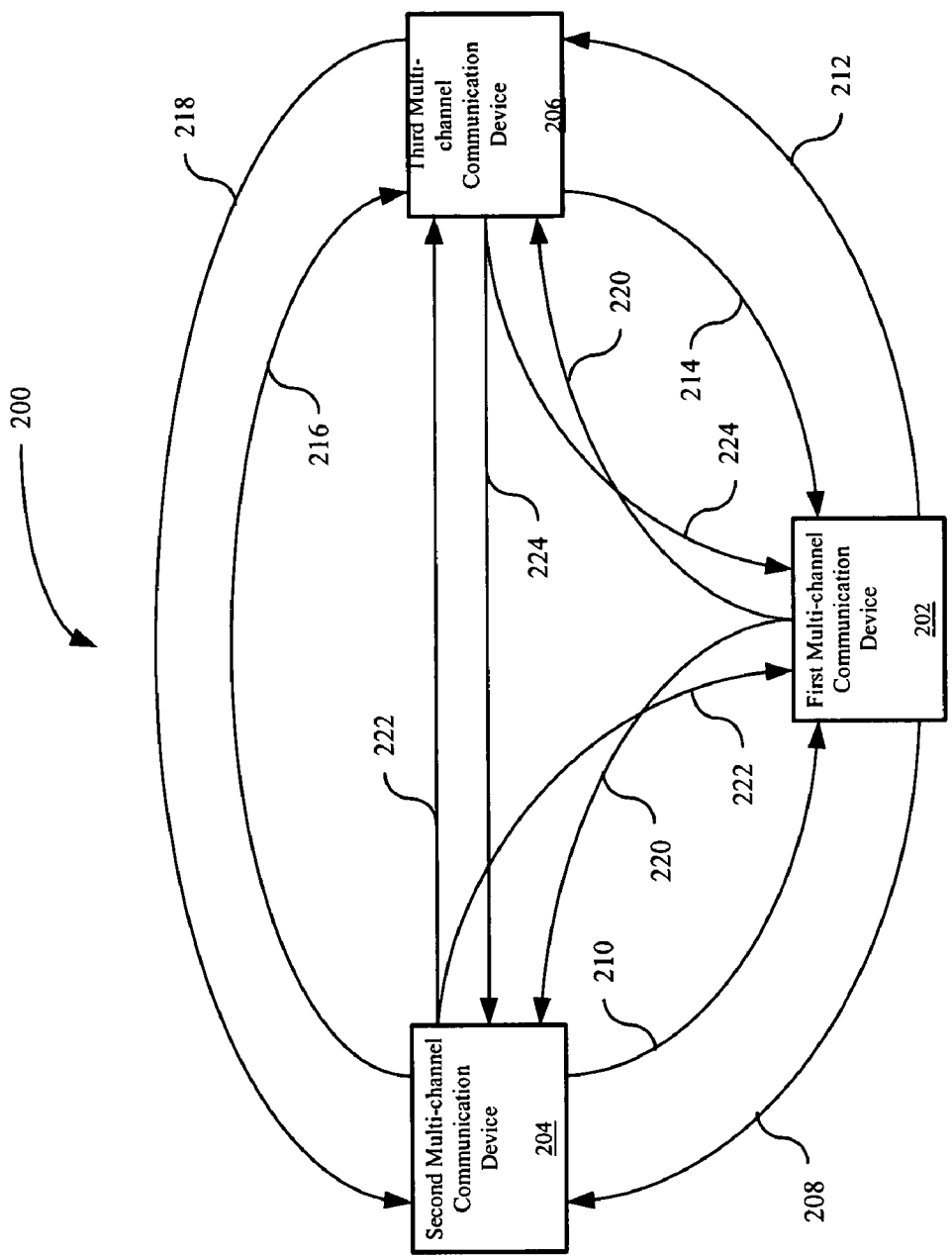
FIG. 2 is a block diagram of an example of an implementation of a multi-channel communication system having a plurality of multi-channel communication devices in accordance with the invention.

In FIG. 2, a block diagram of an example of an implementation of a multi-channel communication system 200 is shown in accordance with the invention. The multi-channel communication system 200 may include a plurality of multi-channel communication devices that are in signal communication with each other and are capable of communicating individually between the individual multi-channel communication devices or communicating in a broadcast mode from an individual multi-channel communication device to all other multi-channel communication devices in the multi-channel communication system 200.

As an example, the multi-channel communication system 200 may include three multi-channel communication devices such as, for example, first multi-channel communication device 202, second multi-channel communication device 204, and third multi-channel communication device 206. While three communication devices are shown in FIG. 2, it is appreciated by those skilled in the art that the multi-channel communication system 200 may include optionally any number of communication devices from two communication devices to as many as desired. As an example, the first multi-channel communication device 202, second multi-channel communication device 204, and third multi-channel communication device 206 may be implemented with wired or wireless multi-channel communication devices that are in signal communication with each other.

The multi-channel communication devices may operate in either specific device-to-device communications mode (i.e., station-to-station dialing) or in a broadcast mode. As an example of a specific device-to-device communications mode, the first multi-channel communication device 202 and second multi-channel communication device 204 may communicate to each other via signal paths 208 and 210. Similarly, the first multi-channel communication device 202 and third multi-channel communication device 206 may communicate to each other via signal paths 212 and 214. Moreover, the second multi-channel communication device 204 and third multi-channel communication device 206 may communicate to each other via signal paths 216 and 218.

As an example of a broadcast mode, the first multi-channel communication device 202 may communicate to both the second multi-channel communication device 204 and the third multi-channel communication device 206 simultaneously via signal path 220. Similarly, the second multi-channel communication device 204 may communicate to both the first multi-channel communication device 202 and the third multi-channel communication device 206 simultaneously via signal path 222. Additionally, the third multi-channel communication device 206 may communicate to both the first multi-channel communication device 202 and the second multi-channel communication device 104 simultaneously via signal path 224. The signal paths 208, 210, 212, 214, 216, 218, 220, 222, and 224 may be either wired and/or wireless communication paths.

In an example of operation, the multi-channel communication devices in the multi-channel communication system 200 may include selection switches (not shown) that allow individual multi-channel communication devices to either communicate in a broadcast mode to all the other multi-channel communication devices simultaneously or to specific other multi-channel communication devices in the specific device-to-device mode. The multi-channel communication system 200 allows two or more users, located at two or more multi-channel communication devices, to communicate back and forth simultaneously because the multi-channel communication system 200 is a full-duplex type of communication system that allows transmitting in both directions simultaneously.

The multi-channel communication system 200 is a full-duplex type of communication system because each multi-channel communication device may include at least two transceivers (not shown) operating at different frequency bands. Each transceiver is configured to either receive or transmit communication signals based on the operation of the corresponding multi-channel communication device.

The different types of operation of the multi-channel communication device having at least two transceivers include: 1) receiving a first frequency band input communication signal from another multi-channel communication device at the first transceiver while no signal is received at the second transceiver; 2) receiving a first frequency band input communication signal from another multi-channel communication device at the first transceiver while also receiving a second frequency band input communication signal from still another multi-channel communication device at the second transceiver; 3) receiving a first frequency band input communication signal from another multi-channel communication device at the first transceiver while transmitting a second frequency band transmitted output signal from the second transceiver; and 4) receiving a second frequency band input communication signal from another multi-channel communication device at the second transceiver while transmitting a first frequency band transmitted output signal from the first transceiver. Therefore, the first transceiver is in operation when the first transceiver receives the first frequency band input communication signal and/or is transmitting the first frequency band transmitted output signal. Similarly, the second transceiver is in operation when the second transceiver receives the second frequency band input communication signal and/or is transmitting the second frequency band transmitted output signal.

Each multi-channel communication device may also include a controller (not shown) that controls the different types of operation of the at least two transceivers. As an example, if the controller determines that the first transceiver is not in operation, then the controller in response commands the first transceiver to transmit a first frequency band transmitted output signal. If instead the controller determines that the first transceiver is in operation and that the second transceiver is not in operation, the controller in response commands the second transceiver to transmit a second frequency band transmitted output signal. Moreover, if the controller determines that the first transceiver and second transceiver are both in operation, the controller in response does not interfere with the operation of the either the first transceiver or second transceiver. Alternatively, if the first transceiver is receiving a first frequency band input communication signal and the second transceiver is receiving a second frequency band input communication signal, the controller in response may command both the first transceiver and second transceiver not to change their respective types of operation and attempt to transmit any signals.

FIG. 2 shows example transmission paths of the different types of operation of the multi-channel communication devices having at least two transceivers. As an example of operation in a full-duplex device-to-device communications mode between a pair of multi-channel communication devices, the first multi-channel communication device 202 may utilize a first transceiver to transmit a first frequency band transmitted output signal to the second multi-channel communication device 204 via signal path 208. The first frequency band transmitted output signal may be modulated utilizing a carrier frequency signal centered at center frequency "A." The second multi-channel communication device 204 would receive the first frequency band input communication signal that is transmitted from the first multi-channel communication device 202 through signal path 208. It is appreciated by those skilled in the art that based on the transmission characteristics of the signal path 208, the first frequency band input communication signal is equal to the first frequency band transmitted output signal minus the transmission characteristics (such as attenuation, noise effects, phase shift, etc.) of the signal path 208. Similarly, the second multi-channel communication device 204 may utilize a second transceiver to transmit a second frequency band transmitted output signal to the first multi-channel communication device 202 via signal path 210. The second frequency band transmitted output signal may be modulated utilizing a carrier frequency signal centered at center frequency "B." The first multi-channel communication device 202 would receive the first frequency band input communication signal that is transmitted from the first multi-channel communication device 204 through signal path 210. Again, it is appreciated that based on the transmission characteristics of the signal path 210, the second frequency band input communication signal is equal to the second frequency band transmitted output signal minus the transmission characteristics of the signal path 210.

Similarly, the second multi-channel communication device 204 may utilize a first transceiver to transmit a first frequency band transmitted output signal to the third multi-channel communication device 206 via signal path 216. Again, the first frequency band transmitted output signal may be modulated utilizing a carrier frequency signal centered at center frequency "A." The third multi-channel communication device 206 would receive the first frequency band input communication signal that is transmitted from the second multi-channel communication device 204 through signal path 216. The first frequency band input communication signal is equal to the first frequency band transmitted output signal minus the transmission characteristics of the signal path 216. Additionally, the third multi-channel communication device 206 may utilize a second transceiver to transmit a second frequency band transmitted output signal to the second multi-channel communication device 204 via signal path 218. The second frequency band transmitted output signal may be modulated utilizing a carrier frequency signal centered at center frequency "B." The second multi-channel communication device 204 would receive the first frequency band input communication signal that is transmitted from the third multi-channel communication device 206 through signal path 218. Again, it is appreciated that based on the transmission characteristics of the signal path 218, the second frequency band input communication signal is equal to the second frequency band transmitted output signal minus the transmission characteristics of the signal path 218.

Moreover, the third multi-channel communication device 206 may utilize a first transceiver to transmit a first frequency band transmitted output signal to the first multi-channel communication device 202 via signal path 214. Again, the first frequency band transmitted output signal may be modulated utilizing a carrier frequency signal centered at center frequency "A." The first multi-channel communication device 202 would receive the first frequency band input communication signal that is transmitted from the third multi-channel communication device 202 through signal path 214. The first frequency band input communication signal is equal to the first frequency band transmitted output signal minus the transmission characteristics of the signal path 214. Similarly, the first multi-channel communication device 202 may utilize a second transceiver to transmit a second frequency band transmitted output signal to the third multi-channel communication device 206 via signal path 212. The second frequency band transmitted output signal may be modulated utilizing a carrier frequency signal centered at center frequency "B." The third multi-channel communication device 206 would receive the first frequency band input communication signal that is transmitted from the first multi-channel communication device 202 through signal path 212. Again, it is appreciated that based on the transmission characteristics of the signal path 212, the second frequency band input communication signal is equal to the second frequency band transmitted output signal minus the transmission characteristics of the signal path 212.

As an example of operation in a device-to-device communications mode between three multi-channel communication devices, the first multi-channel communication device 202 may utilize a first transceiver to transmit a first frequency band transmitted output signal to the second multi-channel communication device 204 via signal path 208. Again, the first frequency band transmitted output signal may be modulated utilizing a carrier frequency signal centered at center frequency "A." The second multi-channel communication device 204 would receive the first frequency band input communication signal that is transmitted from the first multi-channel communication device 202 through signal path 208. Again, it is appreciated the first frequency band input communication signal is equal to the first frequency band transmitted output signal minus the transmission characteristics of the signal path 208. Unlike the example of full-duplex device-to-device communications mode between a pair of multi-channel communication devices, the third multi-channel communication device 206 may utilize a second transceiver to transmit a second frequency band transmitted output signal to the first multi-channel communication device 202 via signal path 214. The second frequency band transmitted output signal may be modulated utilizing a carrier frequency signal centered at center frequency "B." The first multi-channel communication device 202 would receive the first frequency band input communication signal that is transmitted from the third multi-channel communication device 206 through signal path 214. Again, it is appreciated that based on the transmission characteristics of the signal path 214, the second frequency band input communication signal is equal to the second frequency band transmitted output signal minus the transmission characteristics of the signal path 214.

It is appreciated that the second multi-channel communication device 204 may communicate with both the third multi-channel communication device 206 and the first multi-channel communication device 202 in a similar fashion. Additionally, the third multi-channel communication device 206 may also communicate with both the first multi-channel communication device 202 and the second multi-channel communication device 204 in a similar fashion.

It is also appreciated by those skilled in the art that the first multi-channel communication device 202, second multi-channel communication device 204, and third multi-channel communication device 206 may operate as an internal communication system (i.e., "intercom system") in a broadcast mode. As an example, the first multi-channel communication device 202 may broadcast a first frequency band transmitted output signal that may be modulated utilizing a carrier frequency signal centered at center frequency "A." Both the second multi-channel communication device 204 and third multi-channel communication device 206 may receive the first frequency band input communication signal utilizing their respective first transceivers. Similarly, the first multi-channel communication device 202 may broadcast a second frequency band transmitted output signal that may be modulated utilizing a carrier frequency signal centered at center frequency "B" and both the second multi-channel communication device 204 and third multi-channel communication device 206 may receive the second frequency band input communication signal utilizing their respective second transceivers. Again, it is appreciated that based on the transmission characteristics of the signal path 220, the second frequency band input communication signal is equal to the second frequency band transmitted output signal minus the transmission characteristics of the signal path 220.

Additionally, it is appreciated that while this example describes the broadcast mode transmission paths between the first multi-channel communication device 202, second multi-channel communication device 204, and third multi-channel communication device 206 as being along signal path 220, the signal path may equally be described as a combination of signal paths 208 and 212 because the multi-channel communication devices in the multi-channel communication system 200 act a simple peer-to-peer network. Every multi-channel communication device in the multi-channel communication system 200 is equal (i.e., they are all peers) and each multi-channel communication device may communicate with any other multi-channel communication device on an equal basis and the communication information flows directly between two or more multi-channel communication devices without being controlled by any other device such as a server. The signal paths 208, 210, 212, 214, 216, 218, 200, 220, 222, and 224 are illustrative of the directions taken by the communication signals between the multi-channel communication devices along a communication transmission medium such as, for example, a coaxial cable, telephone wire, fiber-optic cable, power-line wires, dedicated cables and/or wires, Ethernet cabling, a communication bus line, and free space (such as air for wireless transmissions).

Figure 3:
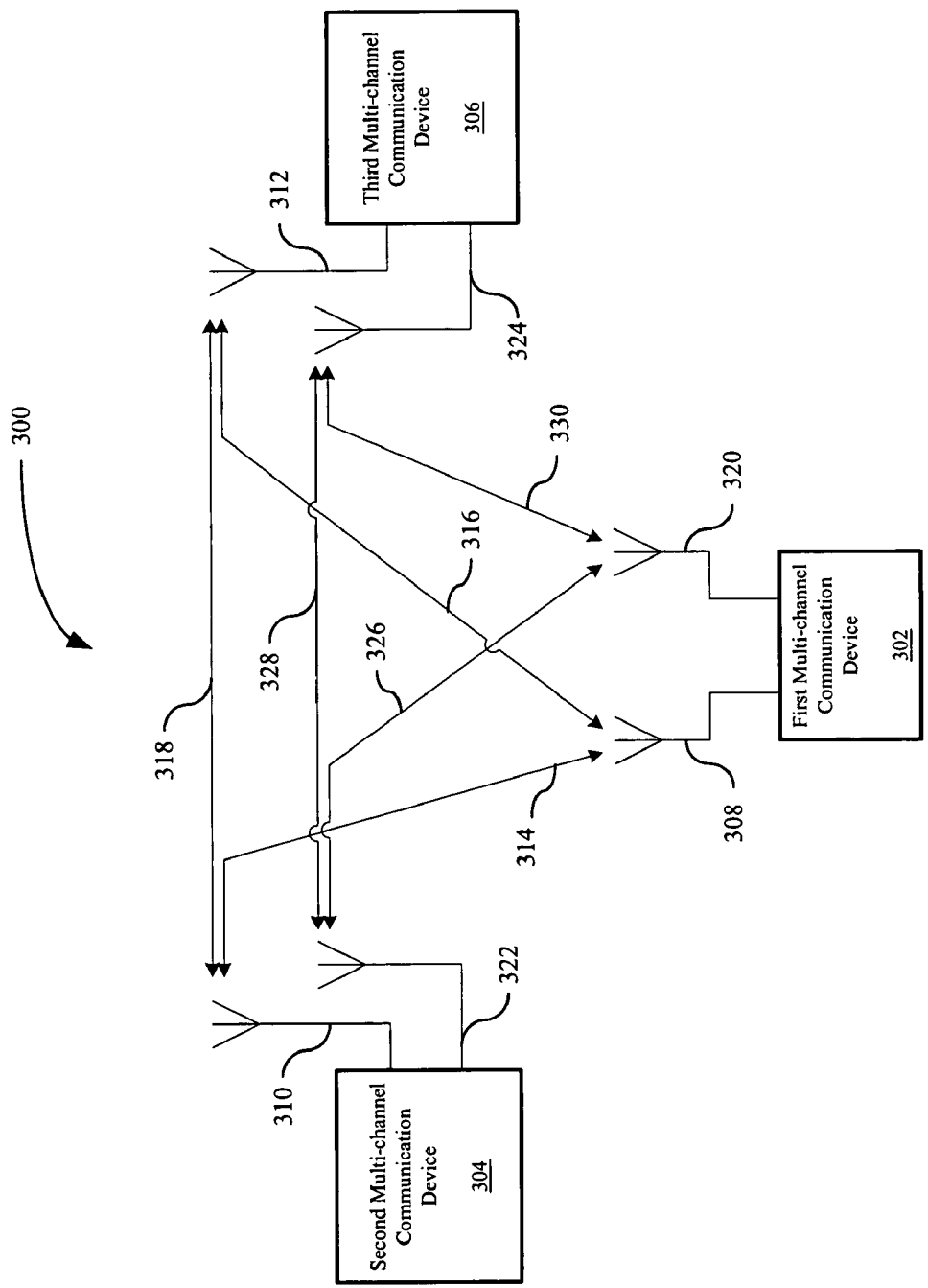
FIG. 3 is a block diagram of another example of an implementation of a multi-channel communication system shown in FIG. 2 having a plurality of wireless multi-channel communication devices in accordance with the invention.

As such, in an example implementation, all the multi-channel communication devices in the multi-channel communication system 200 may freely communicate with each other over a single communication transmission medium such as free-space. In FIG. 3, a block diagram of an example of an implementation of the multi-channel communication system 300 of FIG. 2 in a wireless environment is shown. Similar to FIG. 2, the multi-channel communication system 300 may include three multi-channel communication devices (i.e., first multi-channel communication device 302, second multi-channel communication device 304, and third multi-channel communication device 306) in signal communication with each other in a wireless environment. Each multi-channel communication device may include a first transceiver capable of communicating within a first frequency band centered at center frequency "A" and a second transceiver capable of communicating within a second frequency band centered at center frequency "B." As examples, the first and second transceiver may be any type of wireless transceivers including, for example, analog radio, frequency modulation ("FM"), amplitude modulation ("AM"), single sideband ("SSB"), short wave ("SW"), advanced mobile phone service ("AMPS"), digital radio, phase-shift-keying ("PSK") modulation, quadrature-phase-shift-key ("QPSK"), quadrature-amplitude modulation ("QAM"), time-division multiple access ("TDMA"), frequency division multiple access ("FDMA"), global system for mobile communications ("GSM"), code division multiple access ("CDMA"), frequency-shit keying ("FSK"), modulation, Gaussian frequency-shift keying ("GFSK"), amplitude-shift keying ("ASK"), on/off-shift keying ("OOK"), WiFi, Bluetooth, or other similar wireless transceivers. Examples of the transceivers include the Nordic Semiconductors nRF2401 RF Transceiver, nRF24Z1 Transceiver for Audio Streaming, and nRF24E1 Transceiver/MCU/ADC, all manufactured by Nordic Semiconductor ASA of Norway. Additionally, the multi-channel communication devices may be communication devices that may be incorporated into intercom wall systems, two-way radio devices, cellular telephones, portable computers, personal digital assistants ("PDAs"), head gear such as helmets and headsets, etc.

As an example of operation, the first transceiver 308, FIG. 3, of the first multi-channel communication device 302 may be in signal communication with the first transceiver 310 of the second multi-channel communication device 304 and the first transceiver 312 of the third multi-channel communication device 306, via signal paths 314 and 316, respectively. Additionally, the first transceiver 310 of the second multi-channel communication device 304 and the first transceiver 312 of the third multi-channel communication device 306 may be in signal communication via signal path 318.

When the first transceiver 308 of the first multi-channel communication device 302 transmits a communication signal (i.e., a first frequency band transmitted output signal) at first frequency band centered at center frequency "A," both the first transceiver 310 of the second multi-channel communication device 304 and the first transceiver 312 of the third multi-channel communication device 306 are capable of simultaneously receiving the communication signal (i.e., the first frequency band input communication signal). Similarly, when the first transceiver 310 of the second multi-channel communication device 304 transmits a communication signal both the first transceiver 312 of the third multi-channel communication device 306 and the first transceiver 308 of the first multi-channel communication device 302 are capable of simultaneously receiving the communication signal. Additionally, when the first transceiver 312 of the third multi-channel communication device 306 transmits a communication signal both the first transceiver 310 of the second multi-channel communication device 304 and the first transceiver 308 of the first multi-channel communication device 302 are capable of simultaneously receiving the communication signal.

Similarly, the second transceiver 320 of the first multi-channel communication device 302 may be in signal communication with the second transceiver 322 of the second multi-channel communication device 304 and the second transceiver 324 of the third multi-channel communication device 306, via signal paths 326 and 328, respectively. Additionally, the second transceiver 322 of the second multi-channel communication device 304 and the second transceiver 324 of the third multi-channel communication device 306 may be in signal communication via signal path 330.

When the second transceiver 320 of the first multi-channel communication device 302 transmits a communication signal (i.e., a second frequency band transmitted output signal) at first frequency band centered at center frequency "B," both the second transceiver 322 of the second multi-channel communication device 304 and the second transceiver 324 of the third multi-channel communication device 306 are capable of simultaneously receiving the communication signal (i.e., the second frequency band input communication signal). Similarly, when the second transceiver 322 of the second multi-channel communication device 304 transmits a communication signal both the second transceiver 324 of the third multi-channel communication device 306 and the second transceiver 320 of the first multi-channel communication device 302 are capable of simultaneously receiving the communication signal. Additionally, when the second transceiver 324 of the third multi-channel communication device 306 transmits a communication signal both the second transceiver 322 of the second multi-channel communication device 304 and the second transceiver 320 of the first multi-channel communication device 302 are capable of simultaneously receiving the communication signal.

Control of communication flow may be controlled by controllers (not shown) within each multi-channel communication device. As an example, if the first transceiver 308 of the first multi-channel communication device 302 is not in operation (i.e., it is not receiving or transmitting), the controller in the first multi-channel communication device 302 would determine that the first transceiver 308 is not in operation and would command the first multi-channel communication device 302 to transmit using the free first transceiver 308. If instead, the first transceiver 308 is in operation, the controller would determine that the first transceiver 308 is in operation and command the first multi-channel communication device to operate utilizing the second transceiver 320. If both the first transceiver 308 and second transceiver 320 are in operation the controller would prevent the first multi-channel communication device 302 from attempting to transmit on either the first transceiver 308 and second transceiver 320. This may be generally known as a lock-out condition. Once a transceiver stops operating, the controller will allow transmission with the free transceiver. As a preference of operation, the controller may always attempt to utilize the first transceiver as a default when available.

Figure 4:
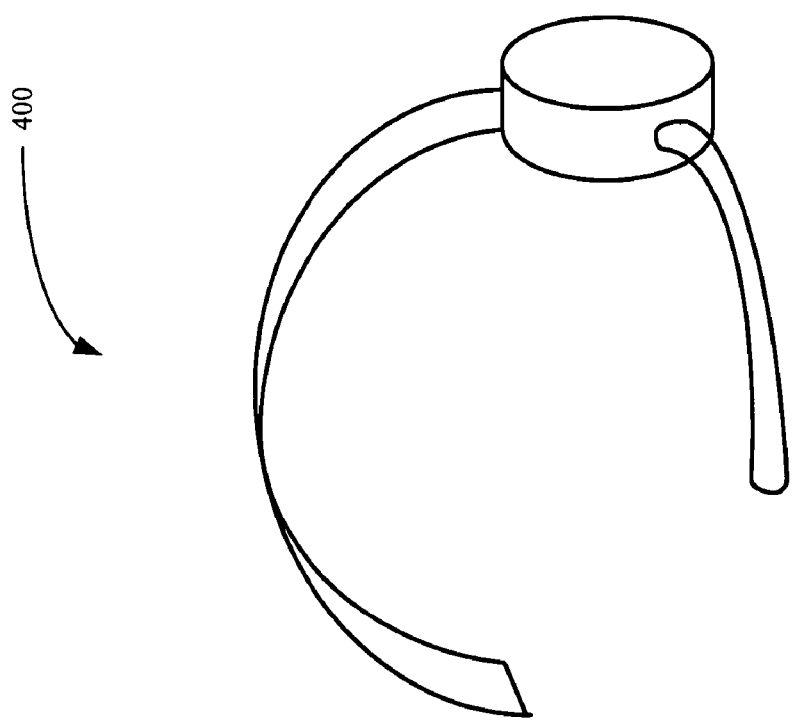
FIG. 4 is a front-perspective view of an implementation of a multi-channel communication device shown in FIG. 3 incorporated into a wireless headset.

In FIG. 4, a front-perspective view of an example of an implementation of a multi-channel communication device 300 shown in FIG. 3 is shown. In FIG. 4, the multi-channel communication device 300 may be incorporated into a wireless or wired head gear such as a headset.

Figure 5:
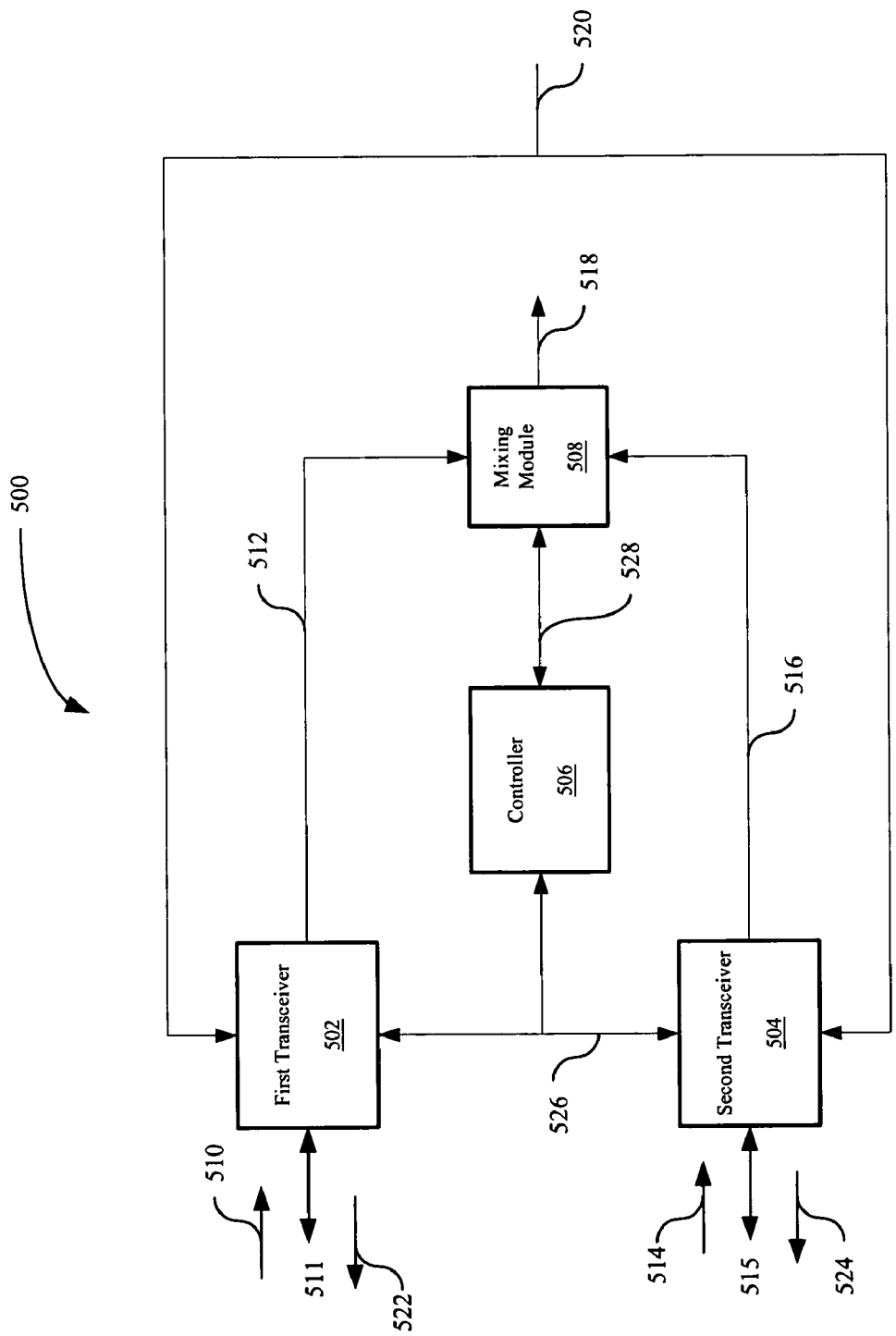
FIG. 5 is a block diagram of an example of an implementation of a multi-channel communication device shown in FIG. 2 in accordance with the invention.

In FIG. 5, a block diagram of an example of an implementation of a multi-channel communication device 500 of either FIG. 2 or 3 is shown. The multi-channel communication device 500 may include a first transceiver 502, second transceiver 504, controller 506, and mixing module 508. The first transceiver 502 receives the first frequency band input communication signal 510, via signal path 511, and produces a corresponding first audio output signal 512 which is passed to the mixing module 508. Similarly, the second transceiver 504 receives the second frequency band input communication signal 514, via signal path 515, and produces a corresponding second audio output signal 516 which is passed to the mixing module 508. The mixing module 508 may include a mixer (not shown) or other signal combiner device capable of combining the first audio output signal 512 and the second audio output signal 516 into a combined output audio signal 518.

The first transceiver 502 also receives an input audio signal 520 and produces a corresponding first frequency band transmitted output signal 522 which is passed along signal path 511. Similarly, the second transceiver 504 also receives the input audio signal 520 and produces a corresponding second frequency band transmitted output signal 524 which is passed along signal path 515.

The controller 506 is in signal communication with both the first transceiver 502 and second transceiver 504, via signal path 526 which may be a bus line, and with the mixing module 508 via signal path 528. The controller 506 may be any type of microcontroller, processor, ASIC, and/or DSP capable of controlling the first transceiver 502, second transceiver 504, and the mixing module 508. An example of such a controller includes the Texas Instruments MSP 430F169 16-bit Microcontroller manufactured by Texas Instruments Inc. of Dallas, Tex. The controller 506 may include memory and a programmable section that is capable of running software. The controller 506 may also be implemented without programmable logic. i.e., using comparators and other simple standard logic gates.

In an example of operation, the controller 506 is capable of determining whether either the first transceiver 502 or the second transceiver 504 or both are in operation and in response selecting which transceiver to use for transmitting the input audio signal 520 based on the determination. In general, if the first transceiver 502 is not in use, the controller 506 selects the first transceiver 502. If the first transceiver 502 is in use, the controller 506 selects the second transceiver 504. If the first transceiver 502 and second transceiver 504 are in use, the controller 506 prevents transmitting the input audio signal 520 and places the multi-channel communication device 500 in a lock-out mode. If both transceivers are initially in operation and one of the transceivers stops operating, the controller 506 selects the transceiver that has ended it operation. The controller 508 is also capable of controlling the type of mixing or combining of the first audio output signal 512 and second audio output signal 516 in the mixing module 508 to produce the combined output audio signal 518.

Figure 6:
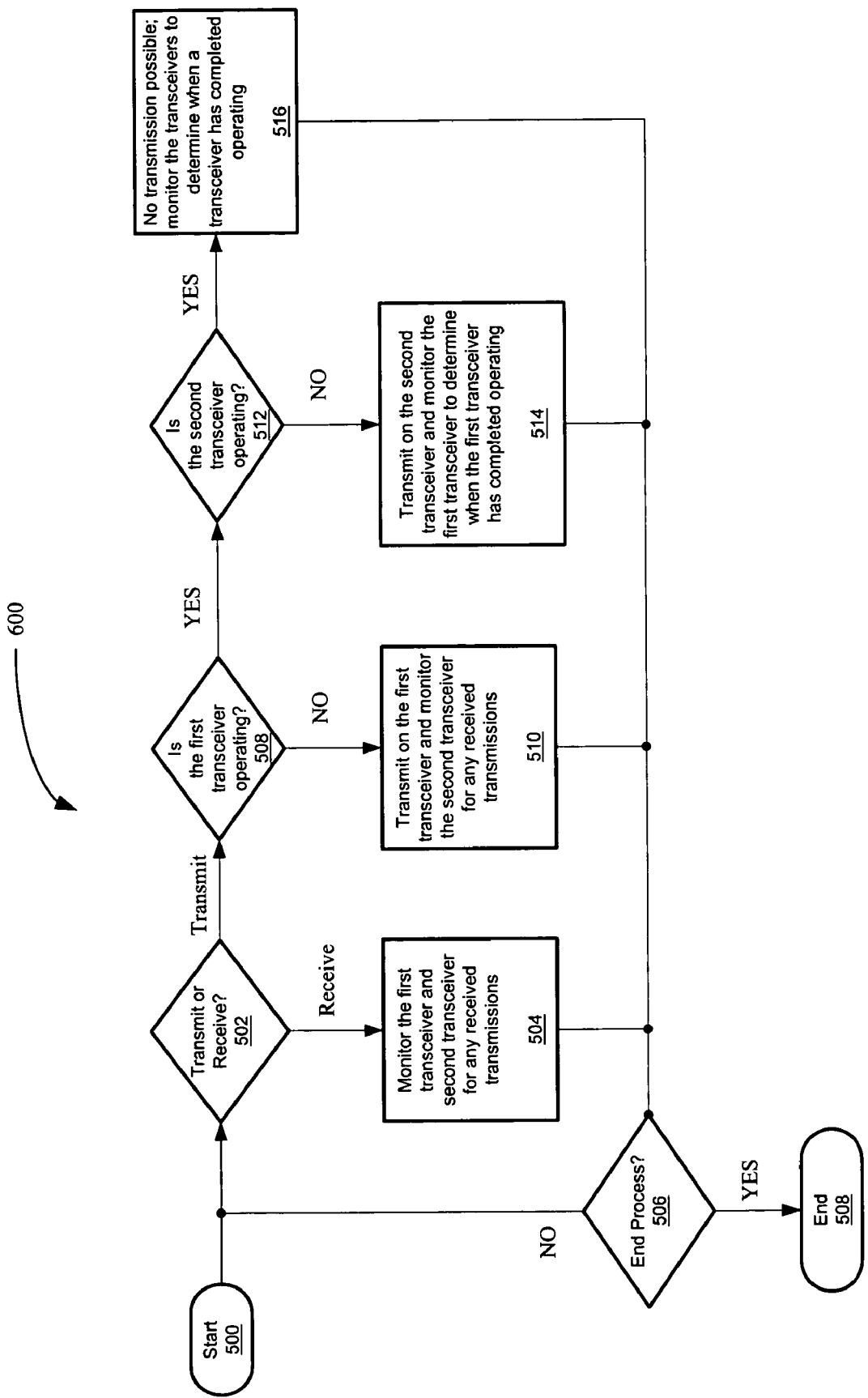
FIG. 6 is a flowchart showing an example process performed by the multi-channel communication device shown in FIG. 5 in accordance with the invention.

In FIG. 6, a flowchart 600 showing an example process performed by the multi-channel communication device of FIG. 5 is shown. The process begins at step 500 and in decision step 502 the controller determines whether the multi-channel communication device is attempting to transmit or receive. If the multi-channel communication device is attempting to receive, the controller in step 504 commands both the first transceiver and second transceiver to monitor for any received transmissions at the multi-channel communication device. In decision step 506 the controller determines whether to end the process or repeat it. If the controller determines that the process should end, the process ends in step 508. If instead the controller determines that the process should continue, the process returns to decision step 502.

If the multi-channel communication device is attempting to transmit, the controller in decision step 508 determines whether the first transceiver is operating (i.e., either receiving or transmitting). If the first transceiver is not operating, the controller in step 510 selects the first transceiver, commands the first transceiver to transmit the desired signal, and commands the second transceiver to monitor for any received transmissions at the multi-channel communication device. In decision step 506 the controller determines whether to end the process or repeat it. If the controller determines that the process should end, the process ends in step 508. If instead the controller determines that the process should continue, the process returns to decision step 502.

If the first transceiver is in operation, the process continues to decision step 512. In decision step 512, the controller determines whether the second transceiver is operating. If the second transceiver is not operating, the controller in step 514 selects the second transceiver, commands the second transceiver to transmit the desired signal, and monitors the first transceiver to determine when the first transceiver has completed operation. In decision step 506 the controller determines whether to end the process or repeat it. If the controller determines that the process should end, the process ends in step 508. If instead the controller determines that the process should continue, the process returns to decision step 502.

If the second transceiver is in operation, the process continues to step 516 and the controller determines that no transmission is possible on either the first transceiver or second transceiver. The controller then monitors the transceivers to determine when a transceiver has completed operating. The process flows to decision step 506. In decision step 506 the controller determines whether to end the process or repeat it. If the controller determines that the process should end, the process ends in step 508. If instead the controller determines that the process should continue, the process returns to decision step 502.

Persons skilled in the art will understand and appreciate, that one or more processes, sub-processes, or process steps described in connection with FIG. 6 may be performed by hardware and/or software. Additionally, the controller 506 may be implemented completely in software that would be executed within a microprocessor, general purpose processor, combination of processors, digital signal processor ("DSP"), and/or application specific integrated circuit ("ASIC"). If the process is performed by software, the software may reside in software memory (not shown) in the controller 506. The software in software memory may include an ordered listing of executable instructions for implementing logical functions (i.e., "logic" that may be implemented either in digital form such as digital circuitry or source code or in analog form such as analog circuitry or an analog source such as an analog electrical, sound or video signal), and may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "computer-readable medium" and/or "signal-bearing medium" is any means that may contain, store, communicate, propagate, or transport the program for use by or in connection with the instruction execution system, apparatus, or device. The computer readable medium may selectively be, for example but not limited to, an electronic, magnetic, optical, electromagnetic, infrared, or semiconductor system, apparatus, device, or propagation medium. More specific examples, but nonetheless a non-exhaustive list, of computer-readable media would include the following: an electrical connection (electronic) having one or more wires; a portable computer diskette (magnetic); a RAM (electronic); a read-only memory "ROM" (electronic); an erasable programmable read-only memory (EPROM or Flash memory) (electronic); an optical fiber (optical); and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

While various embodiments of the invention have been described, it will be apparent to those of ordinary skill in the art that many more embodiments and implementations are possible that are within the scope of this invention. Moreover, it will be understood that the foregoing description of an implementation has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A multi-channel communication device for transmitting on a first frequency band or a second frequency band, the multi-channel communication device comprising:

a first transceiver operating at the first frequency band, wherein the first transceiver includes a first receiver configured to receive a first frequency band input communication signal and in response produce a first received input signal, and a first transmitter configured to receive an audio input signal and in response produce a first transmitted output signal from the audio input signal;

a second transceiver operating at the second frequency band, wherein the second transceiver includes a second receiver configured to receive a second frequency band input communication signal and in response produce a second received input signal, and a second transmitter configured to receive the audio input signal and in response produce a second transmitted output signal from the audio input signal; and a controller in signal communication with the first transceiver and the second transceiver, wherein the controller is configured to determine whether the first transceiver and the second transceiver are in operation, and command the first transceiver to transmit the first transmitted output signal in response to the controller determining that the first transceiver is not in operation, wherein the controller commands the second transceiver to transmit the second transmitted output signal in response to the controller determining that the first transceiver is in operation and that the second transceiver is not in operation, wherein the controller commands both the first transceiver not to transmit the first transmitted output signal and the second transceiver not to transmit the second transmitted output signal in response to the controller determining that both the first transceiver and the second transceiver are in operation, and wherein commanding both the first transceiver not to transmit the first transmitted output signal and the second transceiver not to transmit the second transmitted output signal includes the controller commanding both the first transceiver and the second transceiver not to receive the audio input signal.

2. A multi-channel communication device for transmitting on a first frequency band or a second frequency band, the multi-channel communication device comprising:

a first transceiver operating at a first frequency band, wherein the first transceiver includes means for receiving a first frequency band input communication signal and in response producing a first received input signal, and means for receiving an audio input signal and in response producing a first transmitted output signal from the audio input signal;

a second transceiver operating at a second frequency band, wherein the second transceiver includes means for receiving a second frequency band input communication signal and in response producing a second received input signal, and means for receiving the audio input signal and in response producing a second transmitted output signal from the audio input signal; and a controller in signal communication with the first transceiver and the second transceiver, wherein the controller includes means for determining whether the first transceiver and the second transceiver are in operation, and means for commanding the first transceiver to transmit the first transmitted output signal in response to the controller determining that the first transceiver is not in operation, wherein the commanding means commands the second transceiver to transmit the second transmitted output signal in response to the determining means determining that the first transceiver is in operation and that the second transceiver is not in operation, wherein the commanding means commands both the first transceiver not to transmit the first transmitted output signal and the second transceiver not to transmit the second transmitted output signal in response to the determining means determining that both the first transceiver and the second transceiver are in operation, wherein commanding both the first transceiver not to transmit the first transmitted output signal and the second transceiver not to transmit the second transmitted output signal includes the commanding means commanding both the first transceiver and the second transceiver not to receive the audio input signal.

3. A multi-channel communication system comprising a plurality of multi-channel communication devices wherein each multi-channel communication device of the plurality of multi-channel communication devices comprises:

a first transceiver operating at a first frequency band, wherein the first transceiver includes a first receiver configured to receive a first frequency band input communication signal and in response produce a first received input signal, and a first transmitter configured to receive an audio input signal and in response produce a first transmitted output signal from the audio input signal;

a second transceiver operating at a second frequency band, wherein the second transceiver includes a second receiver configured to receive a second frequency band input communication signal and in response produce a second received input signal, and a second transmitter configured to receive the audio input signal and in response produce a second transmitted output signal from the audio input signal; and a controller in signal communication with the first transceiver and the second transceiver, wherein the controller determines whether the first transceiver and the second transceiver are in operation, and commands the first transceiver to transmit the first transmitted output signal in response to the controller determining that the first transceiver is not in operation, wherein the controller commands the second transceiver to transmit the second transmitted output signal in response to the controller determining that the first transceiver is in operation and that the second transceiver is not in operation, wherein the controller commands both the first transceiver not to transmit the first transmitted output signal the second transceiver not to transmit the second transmitted output signal in response to the controller determining that both the first transceiver and the second transceiver are in operation, and wherein commanding both the first transceiver not to transmit the first transmitted output signal and the second transceiver not to transmit the second transmitted output signal includes the controller commanding both the first transceiver and the second transceiver not to receive the audio input signal.

4. A method for communicating utilizing a multi-channel communication device having a first transceiver and a second transceiver, the method comprising:

determining whether the first transceiver and the second transceiver are in operation; and commanding the first transceiver to transmit a first transmitted output signal in response to determining that the first transceiver is not in operation;

commanding the second transceiver to transmit a second transmitted output signal in response to determining that the first transceiver is in operation and that the second transceiver is not in operation; and commanding both the first transceiver not to transmit the first transmitted output signal and the second transceiver not to transmit the second transmitted output signal in response to determining that the first transceiver and the second transceiver are both in operation,
wherein commanding both the first transceiver not to transmit the first transmitted output signal and the second transceiver not to transmit the second transmitted output signal includes commanding the first transceiver and the second transceiver not to receive an audio input signal.

* * * * *